(12) United States Patent
Suh et al.

(10) Patent No.: US 10,521,642 B2
(45) Date of Patent: Dec. 31, 2019

(54) FINGERPRINT VERIFICATION METHOD AND APPARATUS

(71) Applicant: Samsung Electronics Co., Ltd., Suwon-si, Gyeonggi-do (KR)

(72) Inventors: Sungjoo Suh, Seoul (KR); Wonjun Kim, Hwaseong-si (KR); Youngsung Kim, Suwon-si (KR); Hyunjeong Lee, Hwaseong-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

(21) Appl. No.: 15/088,567

(22) Filed: Apr. 1, 2016

(65) Prior Publication Data

US 2016/0314337 A1    Oct. 27, 2016

(30) Foreign Application Priority Data

Apr. 23, 2015  (KR) .................. 10-2015-0057122
Nov. 12, 2015  (KR) .................. 10-2015-0158684

(51) Int. Cl.
*G06K 9/00* (2006.01)
*G06K 9/62* (2006.01)
*G06K 9/52* (2006.01)

(52) U.S. Cl.
CPC ......... *G06K 9/00093* (2013.01); *G06K 9/001* (2013.01); *G06K 9/00013* (2013.01);
(Continued)

(58) Field of Classification Search
CPC .......... G06K 9/00013; G06K 9/00073; G06K 9/00093; G06K 9/001; G06K 9/522;
(Continued)

(56) References Cited

U.S. PATENT DOCUMENTS 7,720,262 B2 *  5/2010  Svedin ................... G06F 21/32
                                                382/115
9,613,251 B2 *  4/2017  Neskovic ........... G06K 9/00087
(Continued)

FOREIGN PATENT DOCUMENTS

JP    2003030661 A    1/2003
JP    2006039777 A    2/2006
(Continued)

OTHER PUBLICATIONS

Extended European Search Report for Corresponding European Patent Application No. 16166573.2 dated Sep. 6, 2016.
(Continued)

*Primary Examiner* — Iman K Kholdebarin
(74) *Attorney, Agent, or Firm* — Harness, Dickey & Pierce, P.L.C.

(57) ABSTRACT

A fingerprint verification method includes selecting one or more first fingerprint groups from among a plurality of fingerprint groups based on an input fingerprint image, each fingerprint group of the plurality of fingerprint groups including partial fingerprint images; and determining whether verification is successful based on the input fingerprint image and each of the partial fingerprint images included in the one or more first fingerprint groups.

19 Claims, 12 Drawing Sheets

(52) U.S. Cl.
CPC ......... *G06K 9/00073* (2013.01); *G06K 9/522* (2013.01); *G06K 9/6215* (2013.01)

(58) Field of Classification Search
CPC ............. G06K 9/6215; G06K 9/00006; G06K 9/00288; G06K 9/00067; G06K 9/00087
USPC ........................................................ 382/124
See application file for complete search history.

(56) References Cited

U.S. PATENT DOCUMENTS

| | | | |
|---|---|---|---|
| 10,032,062 B2* | 7/2018 | Kim .................... | G06F 16/5838 |
| 2003/0171892 A1 | 9/2003 | Chastel et al. | |
| 2005/0152584 A1* | 7/2005 | Svedin ................... | G06F 21/32 |
| | | | 382/124 |
| 2005/0180614 A1 | 8/2005 | Pandit et al. | |
| 2005/0185828 A1 | 8/2005 | Semba et al. | |
| 2005/0265587 A1 | 12/2005 | Schneider | |
| 2006/0023921 A1* | 2/2006 | Saitoh ................. | G06K 9/3275 |
| | | | 382/115 |
| 2008/0049987 A1* | 2/2008 | Champagne ....... | G06K 9/00026 |
| | | | 382/124 |
| 2008/0226132 A1* | 9/2008 | Gardner ............. | G06K 9/00026 |
| | | | 382/107 |
| 2008/0232713 A1† | 9/2008 | Iizuka | |
| 2008/0279416 A1 | 11/2008 | Lo et al. | |
| 2010/0080425 A1* | 4/2010 | Bebis ................. | G06K 9/00073 |
| | | | 382/125 |
| 2010/0266168 A1* | 10/2010 | Wang .................... | G06K 9/001 |
| | | | 382/124 |
| 2014/0056493 A1 | 2/2014 | Gozzini | |
| 2015/0071508 A1† | 3/2015 | Boshra | |
| 2017/0039410 A1* | 2/2017 | Pi .......................... | G06F 1/1643 |

FOREIGN PATENT DOCUMENTS

| | | |
|---|---|---|
| JP | 2011086130 A | 4/2011 |
| KR | 101006861 B1 | 1/2011 |
| KR | 20110014758 A | 2/2011 |
| KR | 101179559 B1 | 9/2012 |

OTHER PUBLICATIONS

Elena Pivarciova et al: "Industrial production surety factor increasing by a system of fingerprint verification", 2014 International Conference on Information Science, Electronics and Electrical Engineering, IEEE, vol. 1, Apr. 26, 2014 (Apr. 26, 2014), pp. 493-497, XP032672805.

Deepak Kumar Karna et al: "Normalized Cross-Correlation Based Fingerprint Matching", Fifth International Conference on Computer Graphics, Imaging and Visualisation, IEEE, Piscataway, NJ, USA, Aug. 26, 2008, pp. 229-232, XP031322103.

Office Action for Corresponding European Patent Application No. 16166573.2 dated Sep. 4, 2018.

Davide Maltoni et al: "Sources of Information" In: "Handbook of Fingerprint Recognition", 2009, Springer, London, GB, XP055496554, ISBN: 978-1-84882-253-5 pp. 310-317.

Third Party Observation issued by the European Patent Office dated Jun. 20, 2017 for the corresponding EP Patent Application No. 16166573.2.

\* cited by examiner
† cited by third party

FINGERPRINT VERIFICATION METHOD AND APPARATUS

CROSS-REFERENCE TO RELATED APPLICATION

This application claims priority under 35 U.S.C. § 119 to Korean Patent Application No. 10-2015-0057122, filed on Apr. 23, 2015, and No. 10-2015-0158684, filed on Nov. 12, 2015, at the Korean Intellectual Property Office, the entire contents of which are incorporated herein by reference in its entirety.

BACKGROUND

1. Field

At least one example embodiment relates to a fingerprint verification method and apparatus.

2. Description of the Related Art

Biometrics-based user verification technology relates to user verification using one or more of a fingerprint, an iris, a voice, a face, blood vessels, and the like which are individually unique to a user. Such biological characteristics used for the user verification differ from individual to individual, rarely change during a lifetime, and have a relatively low risk of being stolen or copied. In addition, individuals do not need to intentionally carry such characteristics and thus, may not experience inconvenience using such characteristics.

In connection with this type of verification technology, a fingerprint recognition method is commonly used for various reasons, for example, a high level of convenience and security. The user verification by fingerprint method may include enrolling and storing a fingerprint image to be used for fingerprint verification. The user verification method may also include comparing a pre-enrolled fingerprint image to a fingerprint image input by a user requesting user verification, and verifying the user as an enrolled user when a result of the comparing satisfies a preset condition.

SUMMARY

At least one example embodiment relates to a fingerprint verification method.

According to at least some example embodiments, a fingerprint verification method includes selecting one or more first fingerprint groups from among a plurality of fingerprint groups based on an input fingerprint image, each fingerprint group of the plurality of fingerprint groups including partial fingerprint images; and determining whether verification is successful based on the input fingerprint image and each of the partial fingerprint images included in the one or more first fingerprint groups.

The selecting one or more first fingerprint groups may include determining first similarities between the input fingerprint image and each of the partial fingerprint images included in the plurality of fingerprint groups; and selecting the one or more first fingerprint groups based on the first similarities.

The determining first similarities may include determining the first similarities based on image frequency information of the input fingerprint image and image frequency information of each of the partial fingerprint images included in the plurality fingerprint groups.

The determining first similarities may include performing phase correlation between the input fingerprint image and the partial fingerprint images included in the plurality fingerprint groups by a Fourier-Mellin method and determining the first similarities based on a peak value detected based on a result of the performing the phase correlation.

The selecting one or more first fingerprint groups may include determining first similarities between the input fingerprint image and each of the partial fingerprint images included in the plurality fingerprint groups; selecting first candidate partial fingerprint images for each fingerprint group based on the first similarities; determining second similarities between the input fingerprint image and each of the first candidate partial fingerprint images; and selecting the one or more first fingerprint groups based on the second similarities.

The selecting first candidate partial fingerprint images may include selecting a first number of the first candidate partial fingerprint images for each fingerprint group based on the first similarities.

The determining second similarities may include rotating and translating the input fingerprint image based on rotation information and translation information obtained by a Fourier-Mellin method, and determining the second similarities based on overlapping regions between the rotated and translated input fingerprint image and the first candidate partial fingerprint images.

The determining second similarities may include determining the second similarities by a normalized cross correlation scheme based on an image brightness value in the overlapping regions.

The second similarities may be determined by a scheme having a computational complexity higher than that of a scheme used for determining the first similarities.

The determining whether verification is successful may include determining whether the verification is successful based on the determined second similarities between the input fingerprint image and each of the partial fingerprint images included in the one or more first fingerprint groups.

The determining whether verification is successful may include determining whether the verification is successful based on the determined second similarities between the input fingerprint image and each of the first candidate partial fingerprint images included in the one or more first fingerprint groups.

The selecting one or more first fingerprint groups may include determining a plurality of representative values for the plurality of fingerprint groups, respectively, based on the second similarities, and selecting the one or more first fingerprint groups based on the determined plurality of representative values.

The determining whether verification is successful may include selecting at least one partial fingerprint image to be used for score calculation among the partial fingerprint images included in the one or more first fingerprint groups based on the second similarities; calculating a score for the verification based on the at least one selected partial fingerprint image; and determining whether the verification is successful based on the score.

The determining whether verification is successful may include selecting at least one candidate partial fingerprint image from the partial fingerprint images included in the one or more fingerprint groups; and determining whether the verification is successful based on a similarity between the input fingerprint image and the at least one candidate partial fingerprint image.

Each fingerprint group of the plurality of fingerprint groups may include pre-enrolled partial fingerprint images for each finger of a plurality of fingers.

According to at least some example embodiments, a non-transitory computer-readable medium storing a computer program includes instructions that, when executed by one or more processors, cause the one or more processors to implement the fingerprint verification method.

According to at least some example embodiments of the inventive concepts, a biometric verification method may include selecting first candidate biometric data from enrolled biometric data based on first similarities between input biometric data and the enrolled biometric data, the enrolled data being arranged in a plurality of biometric data groups; selecting one or more biometric data groups from among the plurality of biometric data groups based on second similarities between the input biometric data and the first candidate biometric data; and determining whether verification is successful based on the input biometric data and the enrolled biometric data included in the one or more biometric data groups.

The input biometric data may include at least one of information on a fingerprint, information on a body impedance, information on blood vessels, or information on an iris.

According to at least some example embodiments of the inventive concepts, a fingerprint verification apparatus includes a memory storing computer-readable instructions; and one or more processors configured to execute the computer-readable instructions such that the one or more processors are configured to, perform an operation of selecting one or more first fingerprint groups from among a plurality of fingerprint groups based on an input fingerprint image, each fingerprint group of the plurality of fingerprint groups including partied fingerprint images based on an input fingerprint image, and perform an operation of determining whether verification is successful based on the input fingerprint image and each of the partial fingerprint images included in the one or more first fingerprint groups.

The one or more processors may be configured to execute the computer-readable instructions such that the one or more processors are configured to, perform an operation of determining first similarities based on image frequency information of the input fingerprint image and image frequency information of each of the partial fingerprint images included in the plurality of fingerprint groups; perform an operation of selecting first candidate partial fingerprint images for each fingerprint group of the plurality of fingerprint groups based on the first similarities; and perform an operation of selecting the one or more first fingerprint groups based on second similarities between the input fingerprint image and each of the first candidate partial fingerprint images.

The one or more processors may be configured to execute the computer-readable instructions such that the one or more processors are configured to, perform an operation of selecting at least one second candidate partial fingerprint image from the partial fingerprint images included in the one or more first fingerprint groups; and perform an operation of determining whether the verification is successful based on a third similarity between the input fingerprint image and the at least one second candidate partial fingerprint image.

Additional aspects of example embodiments will be set forth in part in the description which follows and, in part, will be apparent from the description, or may be learned by practice of the disclosure.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
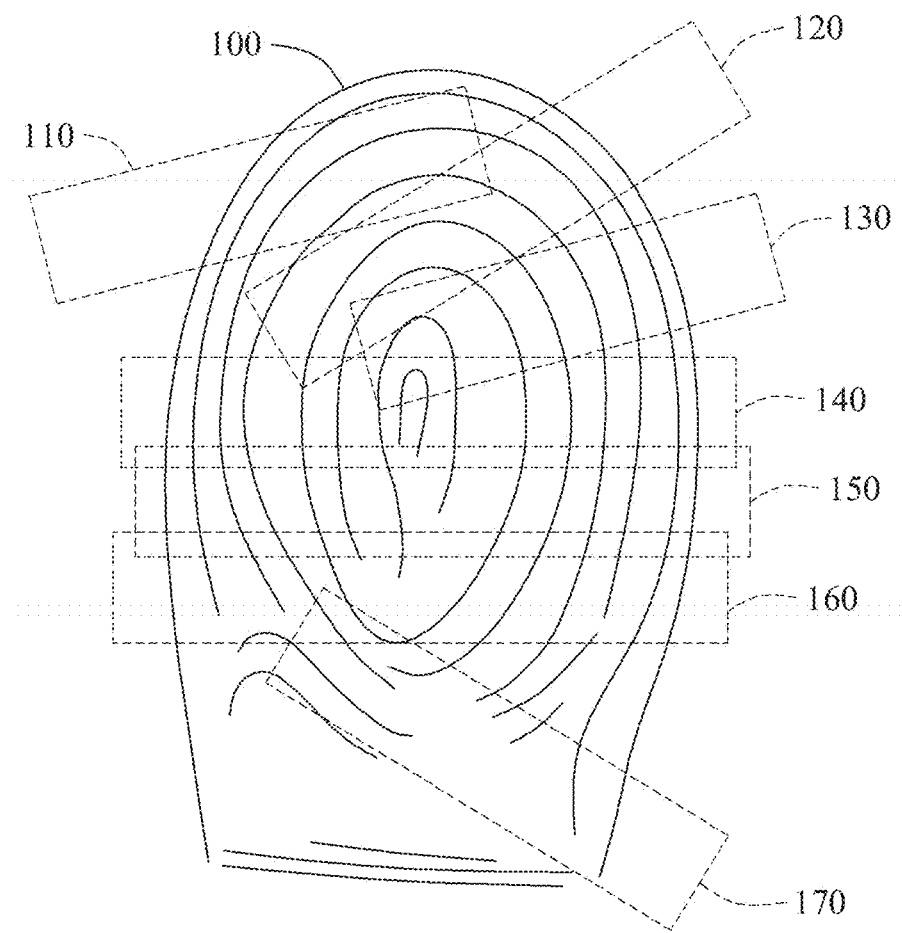
FIGS. 1 and 2 illustrate examples of a fingerprint image according to at least one example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, hut to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, hut do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Example embodiments described herein may be used for verifying a fingerprint of a user. For example, the verifying of the user may include determining whether the user is a pre-enrolled user. In this example, a result of the verifying of the user may be determined based on whether verification succeeds or fails.

Example embodiments described herein may be implemented by a product in various forms, for example, a personal computer (PC), a laptop computer, a tablet computer, a smartphone, a television (TV), a smart home appliance, an intelligent vehicle, a kiosk, and a wearable device. Example embodiments described herein may be applied to verify a user of, for example, a smartphone, a mobile device, and a smart home system. In addition, example embodiments described herein may be applied to a payment service provided through user verification. Further, example embodiments described herein may also be applied to an intelligent automobile system that automatically starts a vehicle through user verification. Hereinafter, example embodiments will be described in detail with reference to the accompanying drawings.

Figure 2:
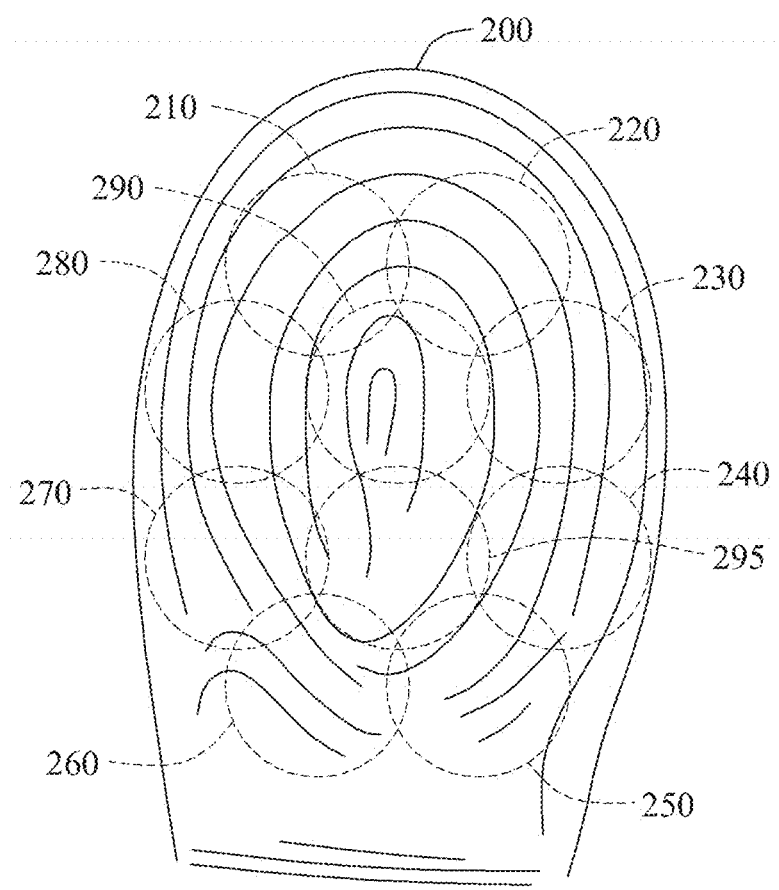

FIGS. 1 and 2 illustrate examples of a fingerprint image according to at least one example embodiment. While FIGS. 1 and 2 are described below with reference to a fingerprint sensor that is not illustrated in FIG. 1 or FIG. 2, an example of such a finger print sensor will be discussed in greater detail below with reference to a fingerprint sensor 420 which is included in a fingerprint verification apparatus 410 illustrated in FIG. 4.

Referring to FIG. 1, a fingerprint sensor (not shown) senses a fingerprint 100 of a user. The fingerprint sensor may sense the fingerprint 100 through a sensing region. For example, the sensing region of the fingerprint sensor may have a rectangular form smaller than the fingerprint 100. In this example, the fingerprint sensor may sense a portion of the fingerprint 100 through the sensing region.

The fingerprint sensor may generate a fingerprint image by capturing the sensed fingerprint 100. When the size of the sensing region is smaller than the size of the fingerprint 100, the fingerprint image generated by the fingerprint sensor may correspond to a partial image including a portion of the fingerprint 100.

The fingerprint image may be used to recognize or enroll the user. In the enrollment operation, the fingerprint image of the user may be enrolled and stored in a storer (e.g., a memory for storing data). When the size of the sensing region of the fingerprint sensor is smaller than the size of the fingerprint 100, a plurality of fingerprint images 110 through 170 corresponding to partial images of the fingerprint 100 of the user may be enrolled. Each of the partial images 110 through 170 may cover the portion of the fingerprint 100, and a combination of the partial images 110 through 170 may substantially or, alternatively, entirely cover the fingerprint 100. Here, the partial images 110 through 170 may overlap one another.

The fingerprint image input in a recognition operation may be compared to an enrolled partial image. Based on whether the fingerprint image matches the enrolled partial image, a result of verifying or identifying the user may be obtained.

Although the sensing region of the fingerprint sensor is illustrated as having a rectangular form in FIG. 1, the sensing region may have various sizes and forms. For example, the sensing region may be provided in a circular form as illustrated in FIG. 2. Referring to FIG. 2, in the enrollment operation, a plurality of partial images 210 through 295 corresponding to a single fingerprint 200 may be enrolled. In the recognition operation, a fingerprint image corresponding to a portion of the fingerprint 200 may be compared to each of the enrolled partial images 210 through 295.

According to at least one example embodiment, a fingerprint sensor used in the enrollment operation may differ from a fingerprint sensor used in the recognition operation. For example, a fingerprint sensor having a rectangular-shaped sensing region as illustrated in FIG. 1 may be used in the enrollment operation, and a fingerprint sensor having a circular-shaped sensing region as illustrated in FIG. 2 may be used in the recognition operation, or vice-versa. Alternatively, the same fingerprint sensor may be used in both the enrollment method and the recognition method.

Figure 3:
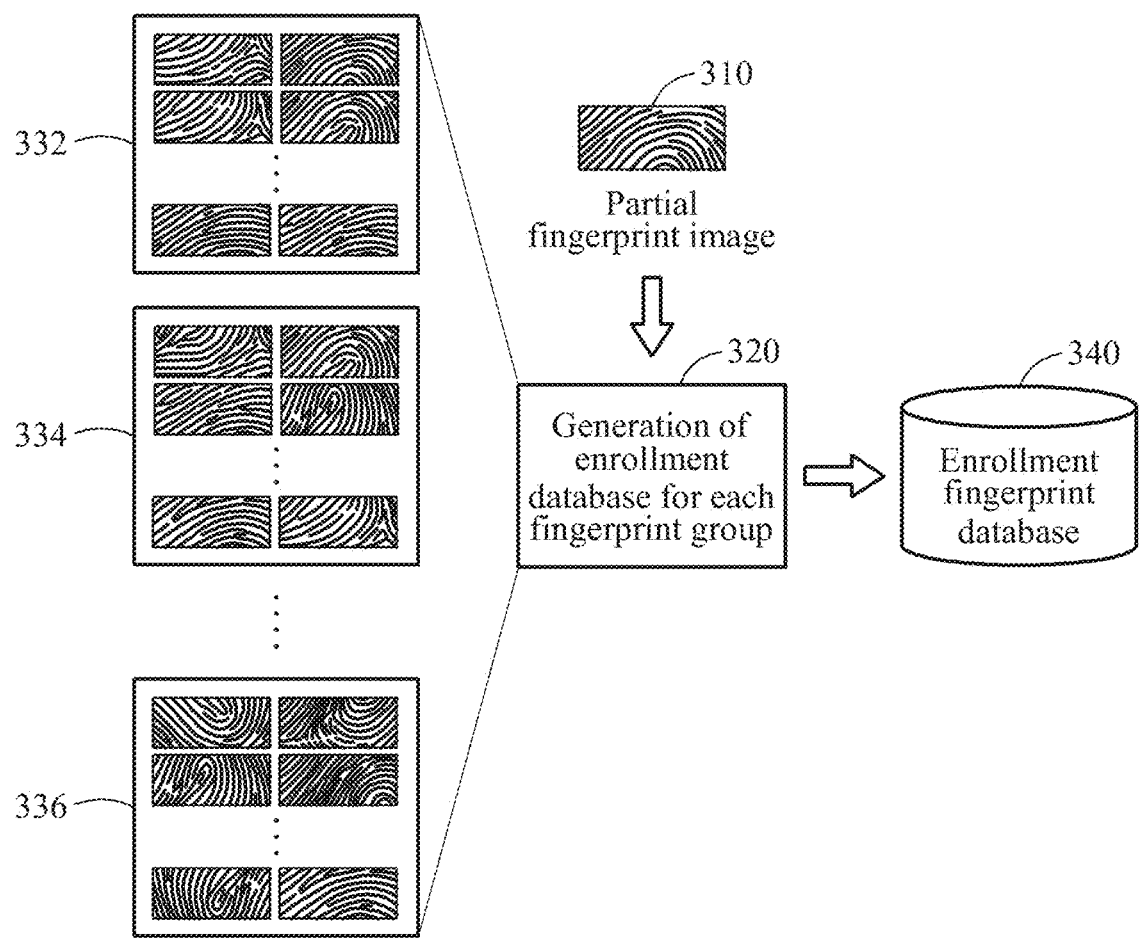
FIG. 3 illustrates an example of a process of enrolling a fingerprint according to at least one example embodiment.

FIG. 3 illustrates an example of a process of enrolling a fingerprint according to at least one example embodiment. Referring to FIG. 3, a user may enroll a partial fingerprint image 310 with respect to at least one finger in a fingerprint enrollment operation. For example, the user may enroll a plurality of partial fingerprint images with respect to an index finger by sensing, a number of times, an index fingerprint through a fingerprint sensor. In this example, the partial fingerprint images may be enrolled without an additional stitching process to generate an entire fingerprint image based on an image composition. Thus, technology having a low operation complexity and effectively using resources may be provided during fingerprint enrollment.

The partial fingerprint image, for example, the partial fingerprint image 310 may be enrolled with respect to each finger, and an enrollment database may be generated for each fingerprint group as indicated by a reference numeral 320. For example, a first fingerprint group 332 including partial fingerprint images enrolled with respect to a first finger, a second fingerprint group 334 including partial fingerprint images enrolled with respect to a second finger, and an Nth fingerprint group 336 including partial fingerprint images with respect to an Nth finger may be enrolled. In this example, the fingerprint groups 332, 334, and 336 with respect to each finger may form a single cluster, and the fingerprint groups 332, 334, and 336 may be differentiated from one another. Enrollment fingerprint images enrolled for each fingerprint group may be stored in an enrollment fingerprint database 340 and may be used in a fingerprint verification process.

For example, according to at least one example embodiment, when a fingerprint is initially registered during a fingerprint enrollment operation, a guide interface of a terminal being used to perform the enrollment, for example, a smartphone, guides a user to register a plurality of fingerprints of a single finger of the user. Accordingly, the fingerprint enrollment operation may include registering multiple partial fingerprint images of the single finger of the user in the terminal by, for example, using a sensor of the terminal to capture the multiple fingerprint images and storing the multiple fingerprint images (e.g., in the terminal or database). According to at least some example embodiments, the multiple partial fingerprint images of the single finger of the user are registered as a fingerprint group. The above-referenced process of registering multiple partial fingerprint images of a finger as a fingerprint group may be performed on one or more other fingers of the same user or one or more fingers of additional users as well, for example, during additional fingerprint enrollment operations. Thus, according to at least some example embodiments, a plurality of fingerprint groups corresponding, respectively, to a plurality of fingers may be determined using the terminal such that each fingerprint group includes partial fingerprint images of only the finger to which the fingerprint group corresponds.

Thus, according to at least some example embodiments, a fingerprint group is defined as a plurality of partial fingerprint images of a single finger of a single user. A fingerprint verification apparatus 410 is an example of the above-referenced terminal and will be discussed in greater detail below with reference to FIG. 4.

Figure 4:
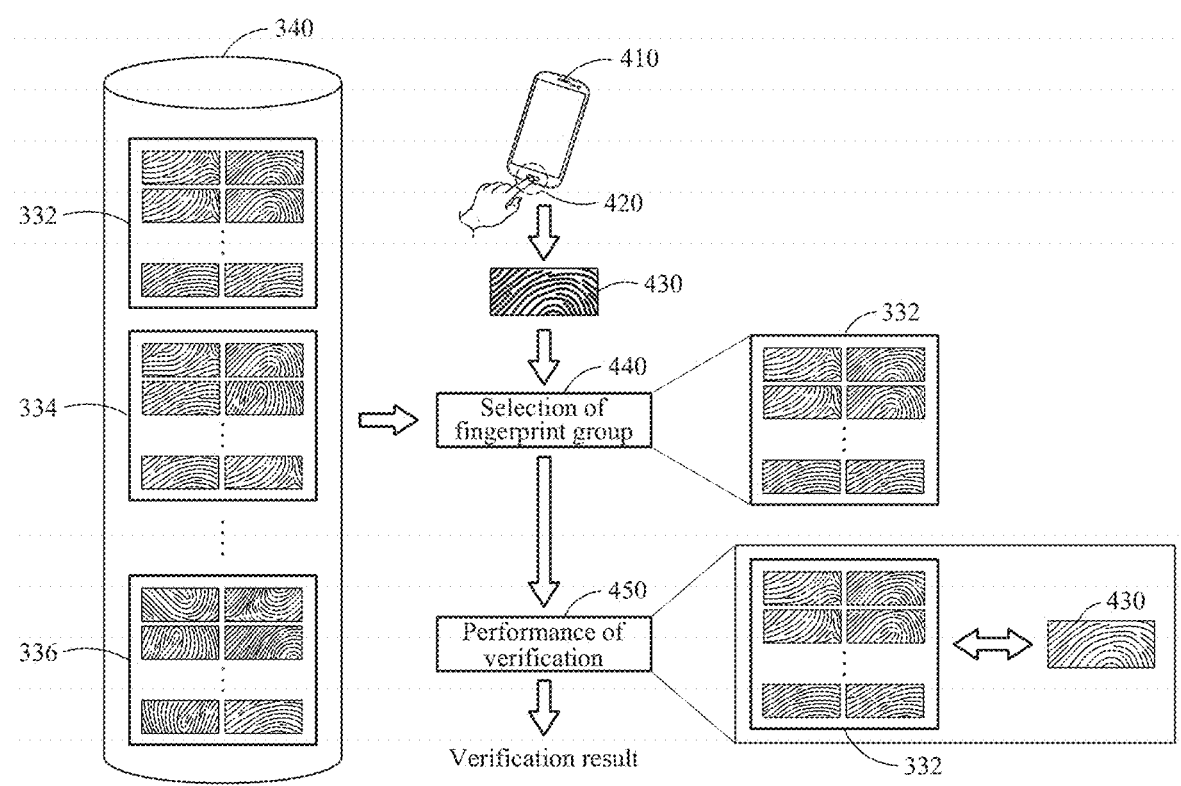
FIG. 4 illustrates an example of a process of performing fingerprint verification according to at least one example embodiment.

FIG. 4 illustrates an example of a process of performing fingerprint verification according to at least one example embodiment. Referring to FIG. 4, a fingerprint verification apparatus 410 includes a fingerprint sensor 420, and a size of a sensing region of the fingerprint sensor 420 may be smaller than a size of a fingerprint of a user. The fingerprint verification apparatus 410 may obtain an input fingerprint image 430 through the fingerprint sensor 420, and the input fingerprint image 430 may include fingerprint information on a desired or, alternatively, predetermined finger of the user. An example structure of the fingerprint verification apparatus 410 will be discussed in greater detail below with reference to fingerprint verification apparatus 1410 of FIG. 14.

The fingerprint verification apparatus 410 may obtain the pre-enrolled fingerprint groups 332, 334, and 336 from the enrollment fingerprint database 340. The enrollment fingerprint database 340 may be stored in a memory (not shown) included in the fingerprint verification apparatus 410 or stored in an external device (not shown), for example, a server connected or connectable to the fingerprint verification apparatus 410 in a wired or wireless manner, or through a network.

The fingerprint verification apparatus 410 may select at least one fingerprint group, as indicated by a reference numeral 440, among the fingerprint groups 332, 334, and 336 by comparing the input fingerprint image 430 to each of partial fingerprint images included in the fingerprint groups 332, 334, and 336. In this example, it is assumed that the fingerprint group 332 is selected. The fingerprint verification apparatus 410 may perform verification, as indicated by a reference numeral 450, by comparing the input fingerprint image 430 to each of partial fingerprint images included in the fingerprint group 332, and the fingerprint verification apparatus 410 may output a result of the verification. The fingerprint verification apparatus 410 may maintain a high recognition rate by performing the fingerprint verification based on a fingerprint group (e.g., based on only one or more selected fingerprint groups and not based on all fingerprint groups), thereby performing the fingerprint verification in a faster manner.

Figure 5:
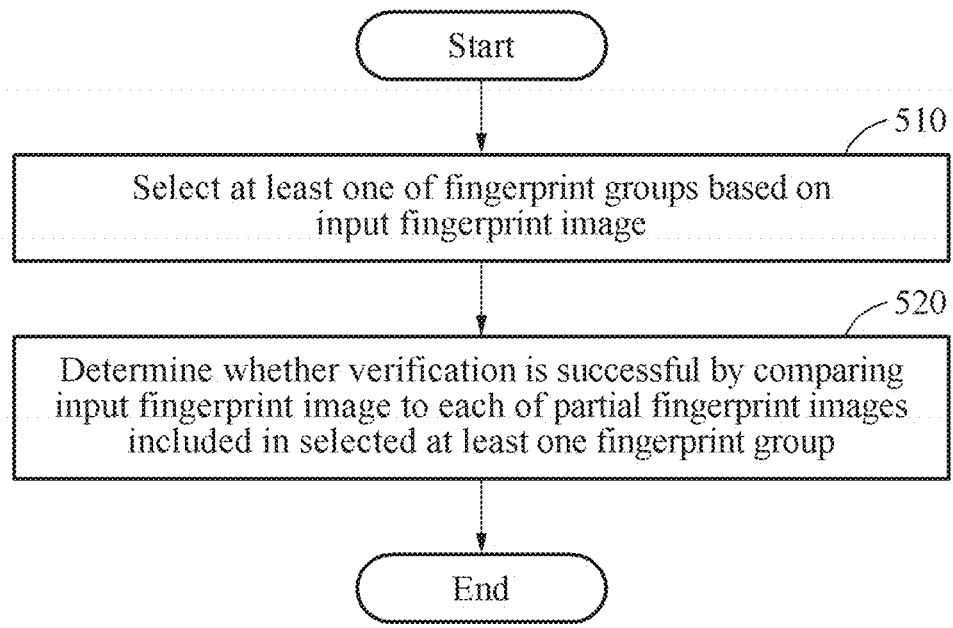
FIG. 5 is a flowchart illustrating an example of a fingerprint verification method according to at least one example embodiment.

FIG. 5 is a flowchart illustrating an example of a fingerprint verification method according to at least one example embodiment.

Referring to FIG. 5, in operation 510, the fingerprint verification apparatus (e.g., the fingerprint verification apparatus 410) selects at least one of fingerprint groups including partial fingerprint images based on an input fingerprint image. The fingerprint verification apparatus may determine a similarity between the input fingerprint image and each of the partial fingerprint images based on image frequency information of the input fingerprint image and image frequency information of each of the partial fingerprint images, and select at least one fingerprint group to perform fingerprint comparing in a more accurate and detailed manner among the fingerprint groups based on the similarity.

The fingerprint verification apparatus may perform a preprocessing process with respect to the input fingerprint image prior to selecting the at least one fingerprint group. The preprocessing process may include a series of operations to enhance quality in the input fingerprint image. For example, the preprocessing process may include one or more of an operation of removing a noise included in the input fingerprint image, an operation of increasing contrast of the input fingerprint image, a deblurring operation of removing a blur included in the input fingerprint image, and a warping operation of correcting a distortion included in the input fingerprint image. Also, the preprocessing process may include an operation of estimating the quality in the input fingerprint image. When the quality in the input fingerprint image is less than a threshold quality, the preprocessing process may include an operation of discarding an obtained input fingerprint image and receiving a new input fingerprint image from a user, for example, by prompting a user of the fingerprint verification apparatus to provide a new fingerprint image.

In operation 520, the fingerprint verification apparatus determines whether verification is successful by comparing the input fingerprint image to each of the partial fingerprint images included in the at least one fingerprint group selected in operation 510. When the fingerprint verification apparatus selects a plurality of fingerprint groups in operation 510, the fingerprint verification apparatus may perform a verification process based on partial fingerprint images included in the selected fingerprint groups. The fingerprint verification apparatus may determine a degree similarity between the input fingerprint image and a portion or a whole of the partial fingerprint images included in the selected fingerprint groups, and determine whether the verification succeeds or fails based on the determined degree of similarity.

When the verification succeeds, the fingerprint verification apparatus may release a lock state of a terminal device connected to the fingerprint verification apparatus or assign a right to a user (e.g., a user who provided the verified input fingerprint image) to access a particular function of the terminal device. When the verification fails, the fingerprint verification apparatus may maintain the lock state of the terminal device or limit the right to access the particular function of the terminal device.

The fingerprint verification apparatus may manage enrolled fingerprint images as a plurality of fingerprint groups and perform fingerprint verification by selecting a fingerprint group to be compared to the input fingerprint image among the fingerprint groups, thereby performing the fingerprint verification in a faster manner. For example, the fingerprint verification in a faster manner because the comparison is performed with respect to only a portion of the stored fingerprint groups, and not all fingerprint groups, thus improving the operation of a processor performing the verification by reducing processing load on the processor.

Repeated descriptions will be omitted for increased clarity and conciseness because the descriptions provided with reference to FIGS. 1 through 4 are also applicable to FIG. 5. Hereinafter, detailed descriptions of operations 510 and 520 will be provided with reference to FIGS. 6 through 9.

Figure 6:
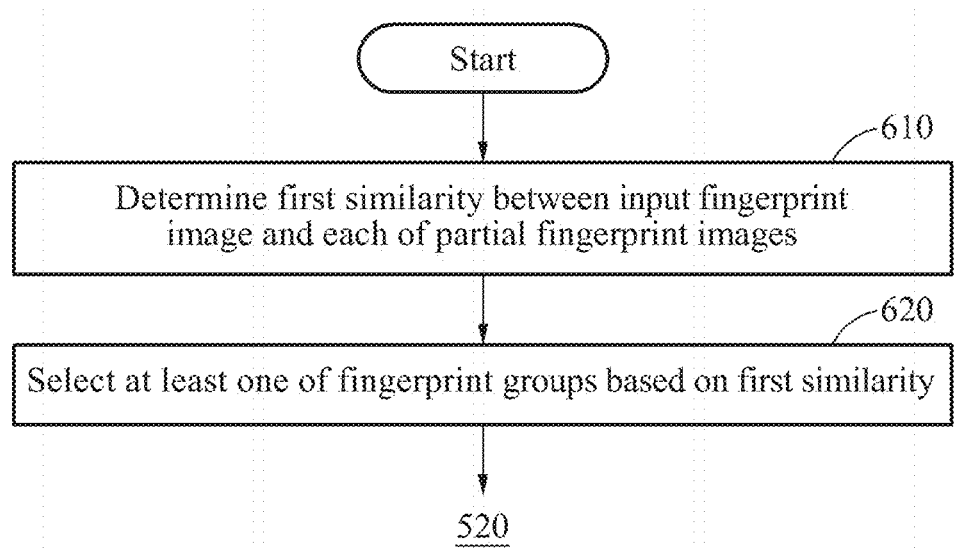
FIG. 6 is a flowchart illustrating an example of a process of selecting a fingerprint group according to at least one example embodiment.

FIG. 6 is a flowchart illustrating an example of a process of selecting a fingerprint group according to at least one example embodiment.

In operation 610, the fingerprint verification apparatus (e.g., the fingerprint verification apparatus 410) determines first similarities by determining a first similarity between an input fingerprint image and each of partial fingerprint images included in fingerprint groups. For example, the fingerprint verification apparatus may determine the first similarities by a matching scheme based on image frequency information, for example, a Fourier-Main method. Here, the Fourier-Mellin method may be referred to as a Fourier-Mellin transform. Detailed description of determining the first similarities based on the Fourier-Mellin method will be provided with reference to FIGS. 11 through 13.

For each enrolled partial image, the first similarity determined with respect to the partial image indicates a degree of a similarity between a fingerprint pattern present in an input fingerprint image and a fingerprint pattern present in the enrolled partial fingerprint image. Accordingly, a high degree of the first similarity indicates that the fingerprint pattern of the input fingerprint image is relatively similar to the fingerprint pattern of the partial fingerprint image. As described above, according to at least some example embodiments, a first similarity may be determined with respect to the input fingerprint image and each of all the partial fingerprint images included in the fingerprint groups.

In operation 620, the fingerprint verification apparatus selects at least one of the fingerprint groups based on the first similarities (also referred to herein as first similarity values) determined in operation 610. In an example, the fingerprint verification apparatus may select, as the at least one fingerprint group selected in operation S620, a fingerprint group of a partial fingerprint image having a highest first similarity among first similarities determined with respect to each of the partial fingerprint images. In another example, the fingerprint verification apparatus may obtain an average value by calculating the first similarities determined with respect to the partial fingerprint images for each fingerprint group, and select a fingerprint group having a highest average value. For example, the fingerprint verification apparatus may determine the fingerprint group having the highest average value by calculating, for each of the fingerprint groups, corresponding first similarity values such that, for each fingerprint group, the first similarity values corresponding to the fingerprint group are first similarity values calculated, respectively, for partial fingerprint images belonging to the fingerprint group; calculating, for each of the fingerprint groups, a corresponding average value such that, for each fingerprint group, the average value corresponding to the fingerprint group is an average of the first similarity values corresponding to the fingerprint group; and selecting, as the at least one fingerprint group selected in operation S620, the fingerprint group corresponding to the highest average value from among the average values calculated for each of the fingerprint groups. In still another example, the fingerprint verification apparatus may calculate a standard deviation with respect to first similarities for each fingerprint group based on the first similarities determined with respect to the partial fingerprint images, and select a fingerprint group having a smallest standard deviation. For example, the fingerprint verification apparatus may determine the fingerprint group having the smallest standard deviation by calculating, for each of the fingerprint groups, corresponding first similarity values such that, for each fingerprint group, the first similarity values corresponding to the fingerprint group are first similarity values calculated, respectively, for partial fingerprint images belonging to the fingerprint group; calculating, for each of the fingerprint groups, a corresponding standard deviation value such that, for each fingerprint group, the standard deviation value corresponding to the fingerprint group is a standard deviation of the first similarity values corresponding to the fingerprint group; and selecting, as the at least one fingerprint group selected in operation S620, the fingerprint group corresponding to the smallest standard deviation value from among the standard deviation values calculated for each of the fingerprint groups. However, the method of selecting a fingerprint group based on first similarities is not limited thereto. The fingerprint verification apparatus may select a fingerprint group based on various methods.

According to at least some example embodiments, in operation 620 the fingerprint verification apparatus selects only a single fingerprint group as the selected at least one fingerprint group. Alternatively, according to at least some example embodiments the fingerprint verification apparatus may select plural fingerprint groups in operation 620 as the selected at least one fingerprint group. For example, instead of selecting the single fingerprint group with the highest average of first similarity values (or, alternatively, the lowest standard deviation), the fingerprint verification apparatus may perform operation 620 by selecting the H fingerprint groups having H highest averages of first similarity values (or, alternatively, the H lowest standard deviations) as the selected at least one fingerprint group, where H is a positive integer equal to or greater than 2.

According to at least some example embodiments, the fingerprint verification apparatus may choose between selecting only one fingerprint group and selecting multiple fingerprint groups in operation 620 based on a threshold value. For example, in operation 620, the fingerprint verification apparatus may determine a fingerprint group having the highest average of first similarity values from among all fingerprint groups. Further, the fingerprint verification apparatus may determine difference values by determining differences between the highest average of first similarity values and all other averages of first similarity values of the other fingerprint groups. The fingerprint verification apparatus may then select, as the selected one or more fingerprint groups, all fingerprint groups that have an average of first similarity values that differs from the highest average of first similarity values by less than the threshold value. Similarly, according to at least some example embodiments, in operation 620, the fingerprint verification apparatus may select, as the selected one or more fingerprint groups, all fingerprint groups that have a standard deviation of first similarity values that differs from the lowest standard deviation of first similarity values by less than the threshold value.

Figure 7:
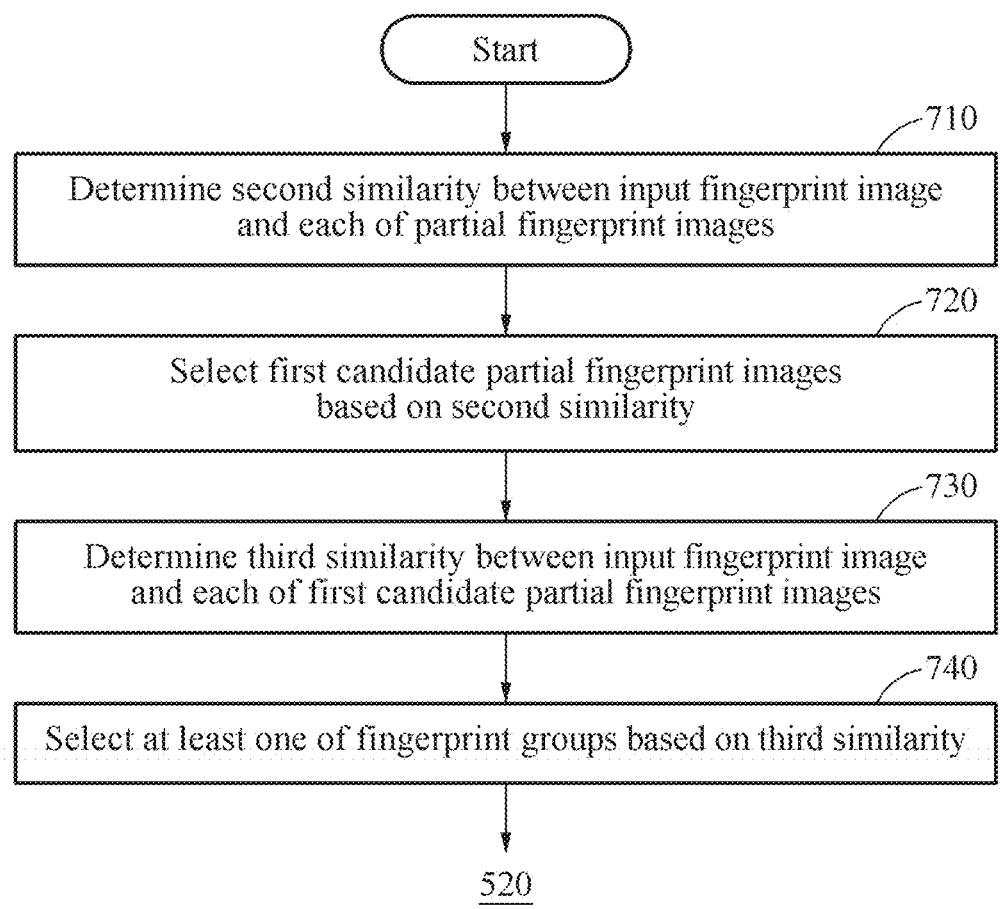
FIG. 7 is a flowchart illustrating another example of a process of selecting a fingerprint group according to at least one example embodiment.

FIG. 7 is a flowchart illustrating another example of a process of selecting a fingerprint group according to at least one example embodiment.

In operation 710, the fingerprint verification apparatus (e.g., the fingerprint verification apparatus 410) determines second similarities between an input fingerprint image and each of partial fingerprint images included in fingerprint groups. Repeated descriptions will be omitted for increased clarity and conciseness because the descriptions provided with reference to operation 610 are also applicable to operation 710 For example, the descriptions of the first similarities of operation 610 are also applicable to the second similarities of operation 710.

In operation 720, the fingerprint verification apparatus selects first candidate partial fingerprint images based on the second similarities determined in operation 710. In this example, a candidate group may be selected from desired or, alternatively, predetermined fingerprint groups while the candidate group is not selected from other fingerprint groups. For example, the fingerprint verification apparatus may select a desired or, alternatively, predetermined number of the first candidate partial fingerprint images starting with a highest second similarity from the entirety of all partial fingerprint images of all fingerprint groups. For example, in operation 720, the fingerprint verification apparatus may rank all partial fingerprint images from among all fingerprint groups by the second similarities determined in operation 710 such that partial fingerprint images corresponding to the highest second similarities have the highest ranks and partial fingerprint images corresponding to the lowest second similarities have the lowest ranks. Further, the fingerprint verification apparatus may select the M highest ranked partial fingerprint images, where M is a positive integer greater than 1 and less than N, and N is the total number of partial fingerprint images included in the entirety of all partial fingerprint images of all the fingerprint groups. When the fingerprint verification apparatus selects M first candidate partial fingerprint images having the M highest second similarities from among the entirety of all partial fingerprint images of all fingerprint groups, the first candidate partial fingerprint images may not be selected for a desired or, alternatively, predetermined fingerprint group because it is possible that one or more fingerprint groups may include none of the M highest ranked partial fingerprint images. In another example, the fingerprint verification apparatus may select, among the partial fingerprint images, partial fingerprint images having a second similarity greater than or equal to a threshold value, as the first candidate partial fingerprint images. The threshold value may be a desired or, alternatively, predetermined value or may be adaptively determined based on the second similarities with respect to the partial fingerprint images. For example, an average value of the second similarities with respect to the entirety of all partial fingerprint images of all fingerprint groups may be determined as the threshold value.

In another example, the fingerprint verification apparatus may select at least one of the first candidate partial fingerprint images for each fingerprint group based on the second similarities. For example, the fingerprint verification apparatus may select a desired or, alternatively, predetermined number of the first candidate partial fingerprint images starting with the highest second similarity for each fingerprint group. For example, in operation 720, for a first fingerprint group from among all fingerprint groups, the fingerprint verification apparatus, may rank all partial fingerprint images of the first fingerprint group by the second similarities determined in operation 710 such that partial fingerprint images of the first fingerprint group corresponding to the highest second similarities have the highest ranks and partial fingerprint images of the first fingerprint group corresponding to the lowest second similarities have the lowest ranks. Further, the fingerprint verification apparatus may select the K highest ranked partial fingerprint images of the first fingerprint group, where K is a positive integer less than L, and L is the total number of partial fingerprint images included in the first fingerprint group. According to at least some example embodiments, the same operations described above with respect to the first fingerprint group are performed for all fingerprint groups, respectively. Thus, according to at least some example embodiments, in operation 720, the fingerprint verification apparatus may select at least K partial fingerprint images from each one of all the fingerprint groups.

In operation 730, the fingerprint verification apparatus determines a third similarity between the input fingerprint image and each of the first candidate partial fingerprint images. The fingerprint verification apparatus may determine the third similarities based on image frequency information of the input fingerprint image and image frequency information of each of the first candidate partial fingerprint images. The fingerprint verification apparatus may determine the third similarities by a matching scheme based on image frequency information having a computational complexity higher than that of a scheme used for determining the second similarities. For example, the fingerprint verification apparatus may use phase correlation information obtained based on a Fourier-Mellin method to determine the second similarities in operation 710. To determine the third similarities in operation 730, translation information and rotation information on images may be used in addition to the phase correlation information. Detailed descriptions of determining the third similarities based on the Fourier-Mellin method will be provided with reference to FIGS. 11 through 13.

In operation 740, the fingerprint verification apparatus selects at least one of the fingerprint groups based on the third similarities determined in operation 730. In an example, the fingerprint verification apparatus may select a fingerprint group of a first candidate partial fingerprint image having a highest third similarity among the third similarities determined with respect to the first candidate partial fingerprint images in operation 730. In another example, the fingerprint verification apparatus may obtain an average value by calculating an average of the third similarities determined with respect to the first candidate partial fingerprint images for each fingerprint group, and select a fingerprint group having a largest average value. For example, in operation 740, the fingerprint verification apparatus may select the fingerprint group for which the first candidate partial fingerprint images belonging to the fingerprint group have the highest average value of third similarities, when compared to the other fingerprint groups having first candidate partial images. In still another example, the fingerprint verification apparatus may calculate a standard deviation with respect to third similarities determined with respect to the first candidate partial fingerprint images for each fingerprint group based on the third similarities determined with respect to the first candidate partial fingerprint images, and may select a fingerprint group having a smallest standard deviation. For example, in operation 740, the fingerprint verification apparatus may select the fingerprint group for which the first candidate partial fingerprint images belonging to the fingerprint group have the lowest standard deviation, when compared to the other fingerprint groups having first candidate partial images. However, the method of selecting a fingerprint group based on third similarities is not limited thereto. The fingerprint verification apparatus may select a fingerprint group based on various methods.

According to at least some example embodiments, in operation 740 the fingerprint verification apparatus selects only a single fingerprint group as the selected at least one fingerprint group. Alternatively, according to at least some example embodiments the fingerprint verification apparatus may select plural fingerprint groups in operation 740 as the selected at least one fingerprint group. For example, instead of selecting the single fingerprint group for which the first candidate partial fingerprint images belonging to the fingerprint group have the highest average value of third similarities (or, alternatively, the lowest standard deviation of third similarities) among all fingerprint groups having first candidate partial images, the fingerprint verification apparatus may perform operation 740 by selecting the J fingerprint groups for which the first candidate partial fingerprint images belonging to the fingerprint groups have the J highest average values of third similarities (or, alternatively, the J lowest standard deviations) among all fingerprint groups having first candidate partial images, where J is a positive integer equal to or greater than 2.

According to at least some example embodiments, the fingerprint verification apparatus may choose between selecting only one fingerprint group and selecting multiple fingerprint groups in operation 740 based on a threshold value in a manner similar to that discussed above with respect to operation 620 of FIG. 6. For example according to at least some example embodiments, in operation 740, the fingerprint verification apparatus may select, as the selected one or more fingerprint groups, all fingerprint groups for which the first candidate partial fingerprint images belonging to the fingerprint groups have average values of third similarities that differ from a top average value by less than a threshold amount. The top average value may be the average value of the third similarities of the first candidate partial fingerprint images of the fingerprint group for which the first candidate partial fingerprint images belonging to the fingerprint group have the highest average value of third similarities among all fingerprint groups having first candidate partial images. Similarly, in operation 740, the fingerprint verification apparatus may select, as the selected one or more fingerprint groups, all fingerprint groups for which the first candidate partial fingerprint images belonging to the fingerprint groups have standard deviations of third similarities that differ from a bottom standard deviation by less than a threshold amount. The bottom standard deviation may be the standard deviation of the third similarities of the first candidate partial fingerprint images of the fingerprint group for which the first candidate partial fingerprint images belonging to the fingerprint group have the lowest standard deviation of third similarities among all fingerprint groups having first candidate partial images.

Figure 8:
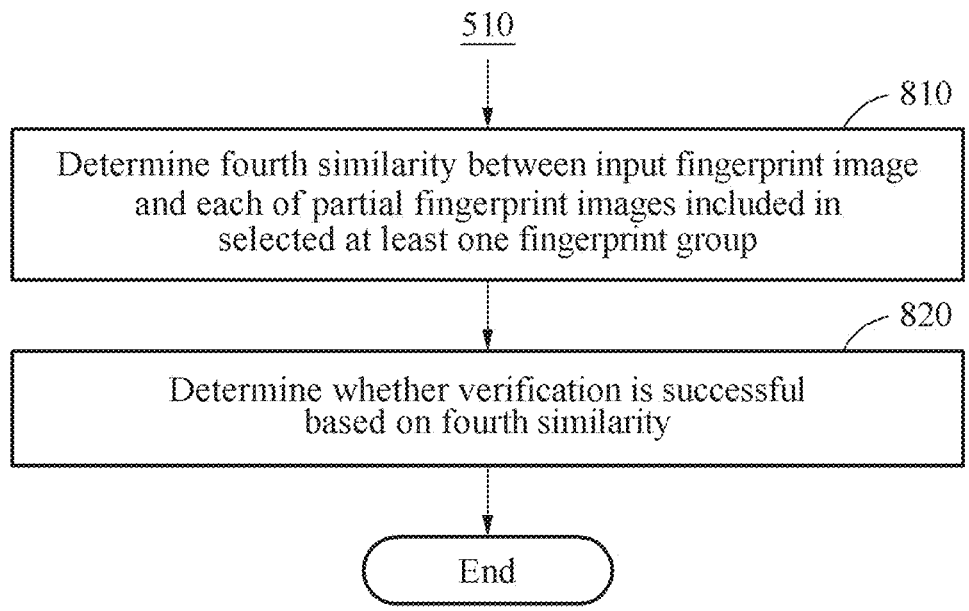
FIG. 8 is a flowchart illustrating an example of a process of determining whether verification is successful according to at least one example embodiment.

FIG. 8 is a flowchart illustrating an example of a process of determining whether verification is successful according to at least one example embodiment.

In operation 810, the fingerprint verification apparatus (e.g., the fingerprint verification apparatus 410) determines a fourth similarity between an input fingerprint image and each of partial fingerprint images included in the at least one fingerprint group selected in operation 510 of FIG. 5. For example, the fingerprint verification apparatus may determine fourth similarities with respect to all of the partial fingerprint images included in the fingerprint group when the fingerprint group is selected. According to at least some example embodiments, in operation 810 the fingerprint verification apparatus may determine the fourth similarities with respect to each partial fingerprint image included in the selected at least one fingerprint group. Thus, according to at least some example embodiments, when operation 510 of FIG. 5 is performed using the operations illustrated in FIG. 7, in operation 810, the fingerprint verification apparatus may determine the fourth similarities even with respect to one or more partial fingerprint images of the selected at least one fingerprint group that were not selected as the first candidate partial fingerprint images in operation 730 of FIG. 7.

In operation 820, the fingerprint verification apparatus determines whether verification is successful based on the fourth similarities determined in operation 810. The fingerprint verification apparatus may determine a score to determine fingerprint verification based on the fourth similarities with respect to the partial fingerprint images, and determine whether the verification is successful based on the score. For example, a maximum value among the fourth similarities or an average value of the fourth similarities may be determined as the score. The fingerprint verification apparatus may determine that the verification succeeds when the score is greater than or equal to a threshold value. Conversely, the fingerprint verification apparatus may determine that the verification fails when the score is less than the threshold value. According to at least some example embodiments, the threshold value may be set in accordance with the preferences of a manufacture and/or user of the fingerprint verification apparatus.

In another example, when operation 510 of FIG. 5 is performed using the operations illustrated in FIG. 7, the fingerprint verification apparatus may perform operation 820 by determining whether the verification is successful based on the third similarities determined with respect to the first candidate partial fingerprint images in operation 730 of FIG. 7, in lieu of determining the fourth similarities with respect to all the partial fingerprint images included in the fingerprint group in the manner discussed above. Thus, according to at least some example embodiments, operation 810 may be omitted. The fingerprint verification apparatus may determine the score based on the third similarities with respect to the first candidate partial fingerprint images included in the selected fingerprint group, and determine whether the verification is successful by comparing the score to the threshold value.

Figure 9:
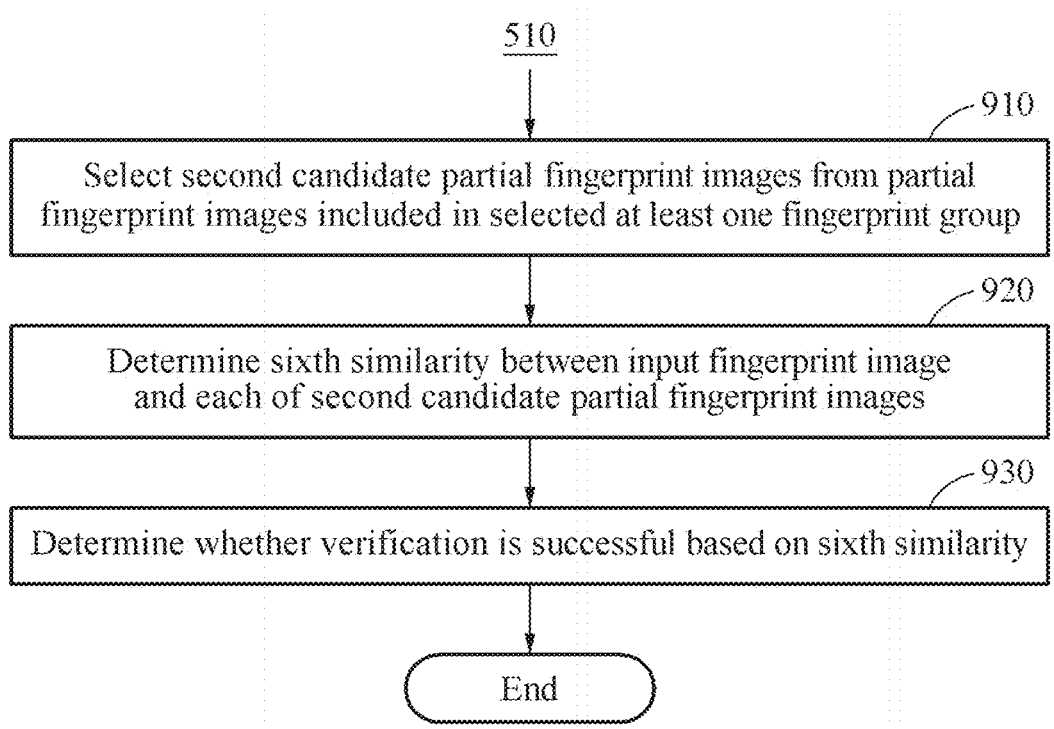
FIG. 9 is a flowchart illustrating another example of a process of determining whether verification is successful according to at least one example embodiment.

FIG. 9 is a flowchart illustrating another example of a process of determining whether verification is successful according to at least one example embodiment.

In operation 910, the fingerprint verification apparatus (e.g., the fingerprint verification apparatus 410) selects second candidate partial fingerprint images from the partial fingerprint images included in the fingerprint group selected in operation 510. For example, in operation 910 the fingerprint verification apparatus may determine fifth similarities with respect to all the partial fingerprint images included in the selected fingerprint group, and select a desired or, alternatively, predetermined number of the second candidate partial fingerprint images starting from a highest fifth similarity. According to at least some example embodiments, the fingerprint verification apparatus may determine the fifth similarities in operation 910 in the same manner discussed above with respect to the fourth similarities of operation 810.

In operation 920, the fingerprint verification apparatus determines a sixth similarity between the input fingerprint image and each of the second candidate partial fingerprint images. For example, the fingerprint verification apparatus may extract minutiae of a fingerprint pattern from the input fingerprint image and each of the second candidate partial fingerprint images and determine the sixth similarities based on a degree of matching between the minutiae. When the degree of matching between the minutiae increases, the degree of the sixth similarity may increase.

In operation 930, the fingerprint verification apparatus determines whether the verification is successful based on the sixth similarities determined in operation 920. The fingerprint verification apparatus may determine a score based on sixth similarities with respect to the second candidate partial fingerprint images, and determine whether the verification is successful based on the score. For example, a maximum value among the sixth similarities or an average value of the sixth similarities may be determined as the score. The fingerprint verification apparatus may determine that the verification succeeds when the score is greater than or equal to a threshold value. Conversely, the fingerprint verification apparatus may determine that the verification fails when the score is less than the threshold value. According to at least some example embodiments, the threshold value may be set in accordance with the preferences of a manufacture and/or user of the fingerprint verification apparatus.

Figure 10A:
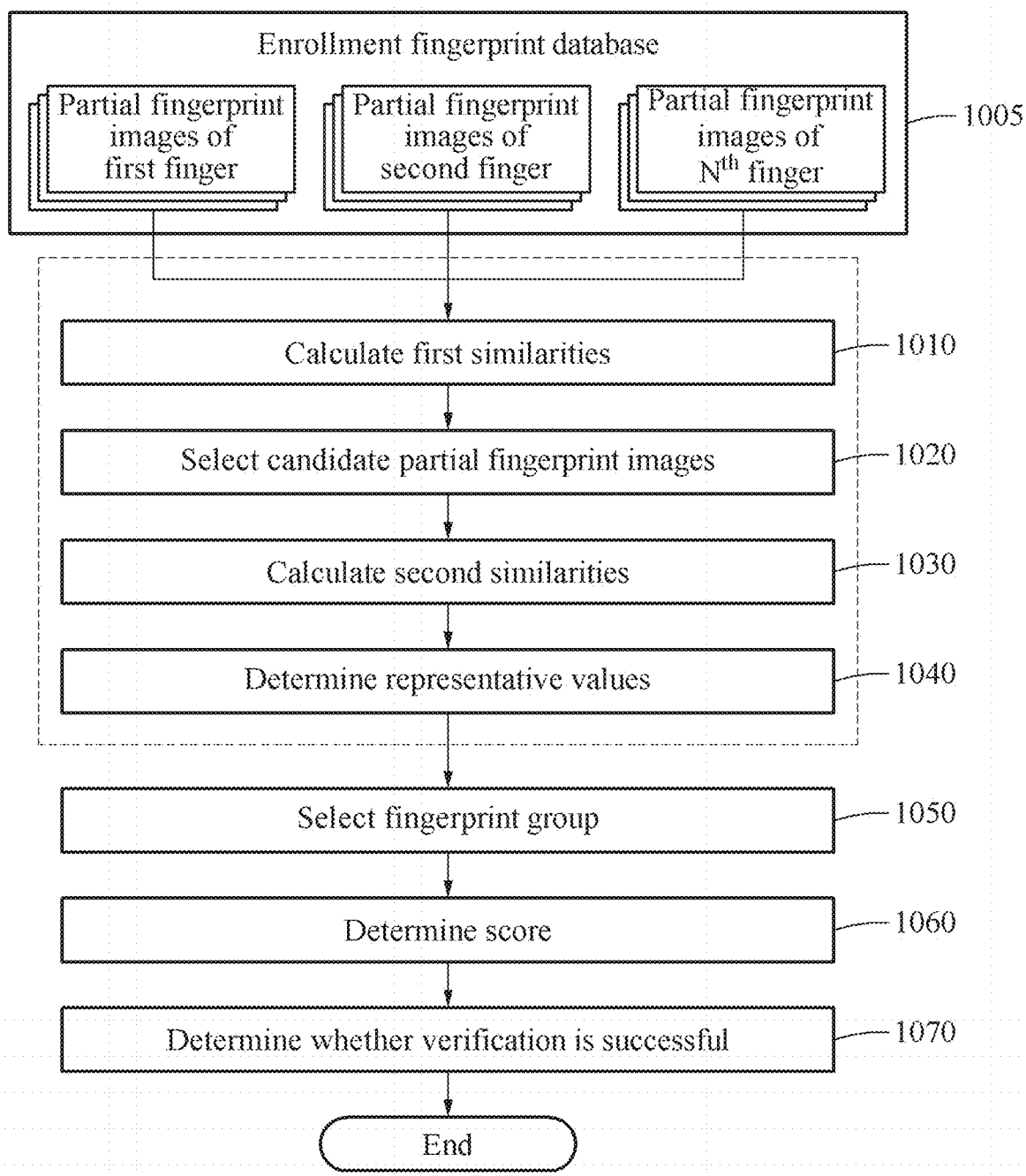
FIGS. 10A and 10B are flowcharts illustrating examples of determining whether verification is successful based on an input fingerprint image according to at least one example embodiment.
Figure 10B:
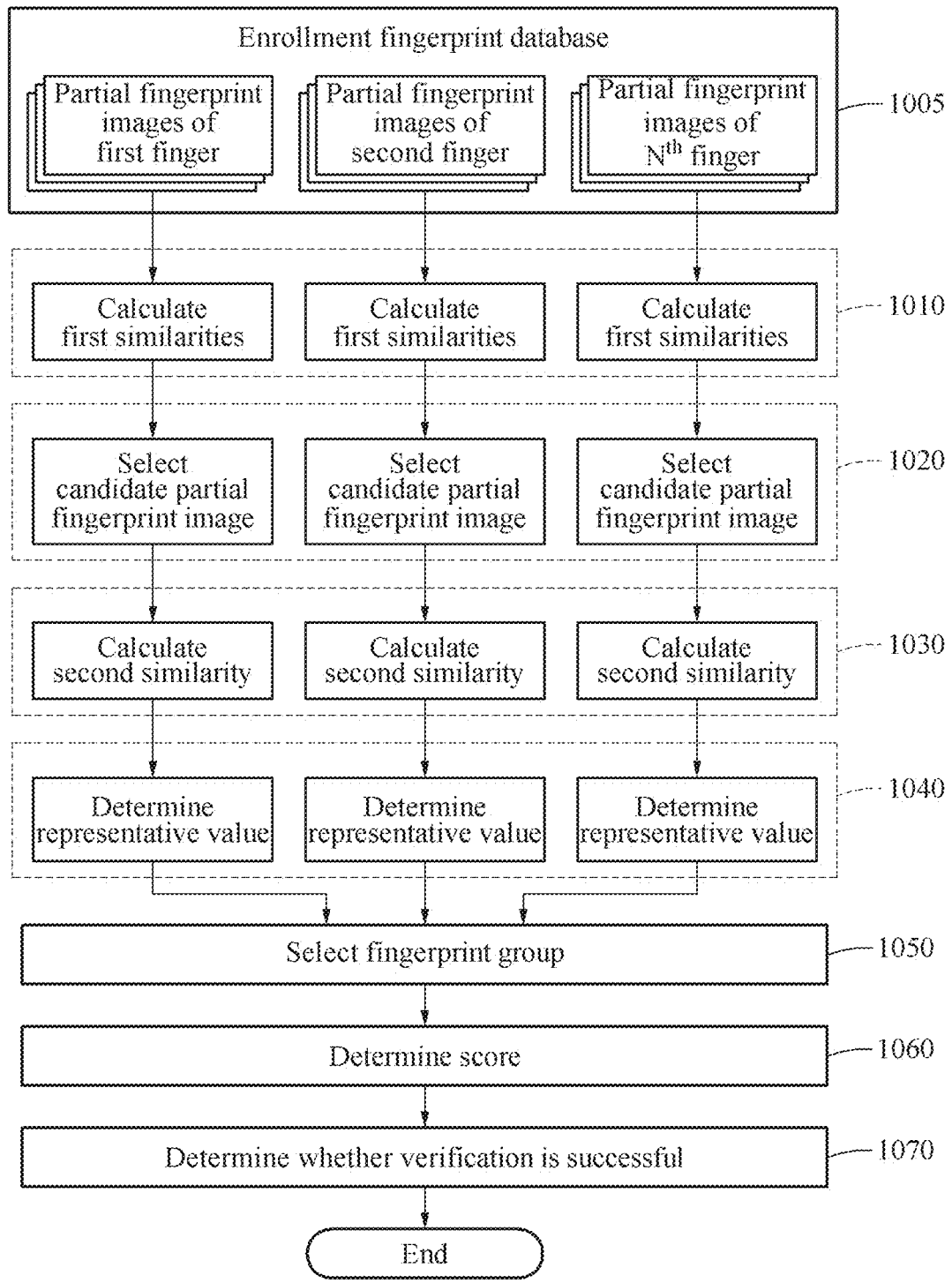

FIGS. 10A and 10B are flowcharts illustrating examples of determining whether verification is successful based on an input fingerprint image according to at least one example embodiment.

Referring to FIG. 10A, in operation 1010, the fingerprint verification apparatus (e.g., the fingerprint verification apparatus 410) may calculate a first similarity between an input fingerprint image and each of partial fingerprint images stored in an enrollment fingerprint database 1005 when the fingerprint verification apparatus receives the input fingerprint image. The enrollment fingerprint database 1005 may include partial fingerprint images of a finger, for example, a first finger, a second finger, and an Nth finger enrolled for each fingerprint group, and partial fingerprint images of each finger may form fingerprint groups being differentiated from one another. The first similarities may be calculated with respect to each of the partial fingerprint images of the first finger, the second finger, and the Nth finger.

In operation 1020, the fingerprint verification apparatus selects a plurality of candidate partial fingerprint images based on the first similarities. For example, the fingerprint verification apparatus may select a desired or, alternatively, predetermined number of candidate partial fingerprint images among all enrolled partial fingerprint images based on sizes of first similarities of enrolled fingerprint images. In operation 1030, the fingerprint verification apparatus may calculate a second similarity between the input fingerprint image and each of the candidate partial fingerprint images. The fingerprint verification apparatus may calculate the second similarities based on a scheme having a computational complexity higher than and more detailed than that of a scheme used for determining the first similarities.

In operation 1040, the fingerprint verification apparatus may determine a representative value, for example, a maximum value, an average value, and a standard deviation, for each fingerprint group in which a candidate partial fingerprint image is selected based on the second similarity.

In another example, operations 1010 through 1040 may be performed for each fingerprint group as illustrated in FIG. 10B. For example, the fingerprint verification apparatus (e.g., the fingerprint verification apparatus 410) may calculate a first similarity for each fingerprint group with respect to the first finger, the second finger, and the Nth finger and select at least one candidate partial fingerprint image for each fingerprint group based on the calculated first similarities. Subsequently, the fingerprint verification apparatus may calculate the second similarities between the input fingerprint image and each of the candidate partial fingerprint images and determine a representative value for each fingerprint group based on the second similarity. The descriptions provided with reference to operations 1050 through 1070 are also applicable to FIGS. 10A and 10B.

In operation 1050, the fingerprint verification apparatus selects a fingerprint group corresponding to the input fingerprint image among fingerprint groups enrolled in the enrolled fingerprint database 1005 based on the representative value determined for each fingerprint group in which the candidate partial fingerprint image is selected.

In operation 1060, the fingerprint verification apparatus determines a score with respect to the partial fingerprint images included in the fingerprint group selected in operation 1050. In an example, the fingerprint verification apparatus may select at least one partial fingerprint image to be used for score calculation among all the partial fingerprint images included in the selected fingerprint group based on the second similarity. For example, among all the partial fingerprint images, the fingerprint verification apparatus may select a desired or, alternatively, predetermined number of partial fingerprint images starting from a highest similarity or select a partial fingerprint image having a second similarity greater than or equal to the threshold value. The fingerprint verification apparatus may determine a score for the verification based on the at least one selected partial fingerprint image. The method of determining the score is not limited, and the fingerprint verification apparatus may determine the score based on various methods.

In operation 1070, the fingerprint verification apparatus determines whether the verification is successful based on the score. For example, the fingerprint verification apparatus may determine that the verification succeeds when the score is greater than or equal to the threshold value. Conversely, the fingerprint verification apparatus may determine that the verification fails when the score is less than the threshold value. According to at least some example embodiments, the threshold value may be set in accordance with the preferences of a manufacture and/or user of the fingerprint verification apparatus.

Figure 11:
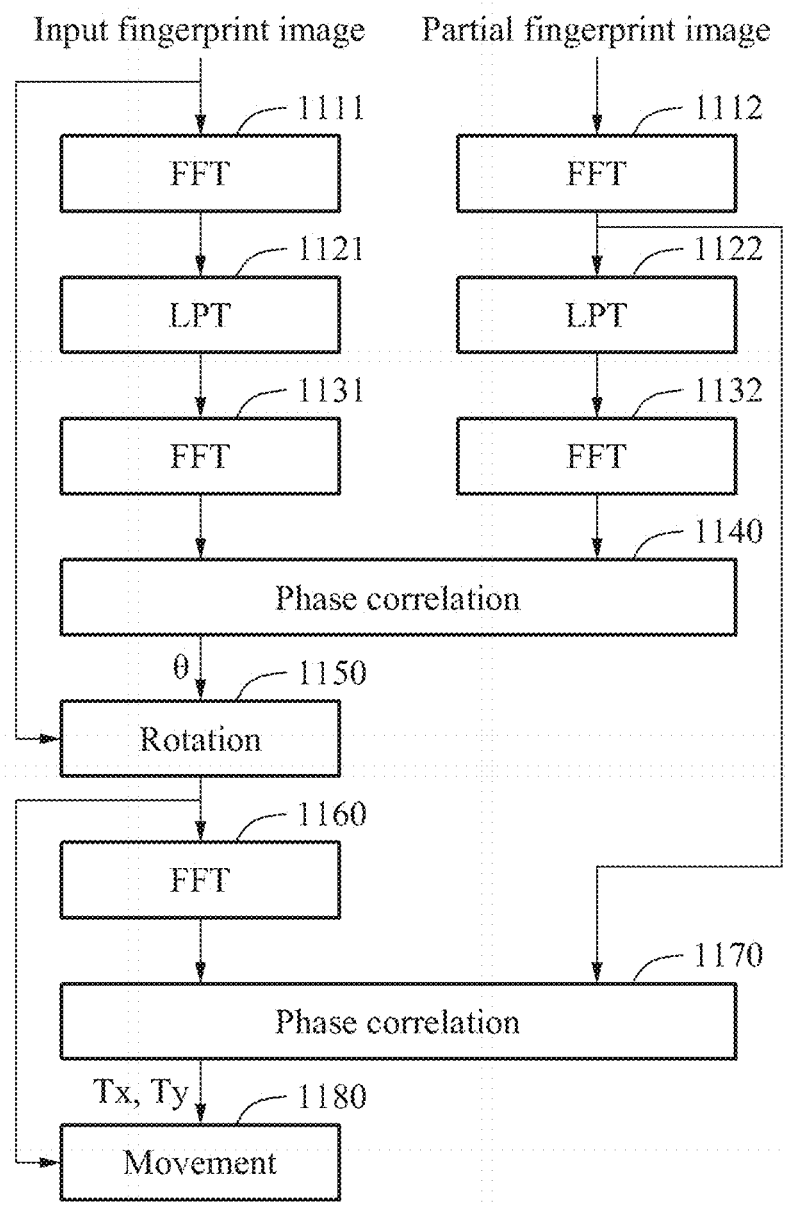
FIG. 11 is a flowchart illustrating an example of a process of determining a similarity by a Fourier-Mellin method according to at least one example embodiment.

FIG. 11 is a flowchart illustrating an example of a process of determining a similarity by a Fourier-Mellin method according to at least one example embodiment.

Referring to FIG. 11, in operation 1111, the fingerprint verification apparatus (e.g., the fingerprint verification apparatus 410) may convert information on a space domain included in an input fingerprint image to information on a frequency domain based on a fast Fourier transform (FFT). In operation 1112, the fingerprint verification apparatus may convert the information on the space domain included in a partial fingerprint image to the information on the frequency domain based on the FFT. The information on the frequency domain may be based on an orthogonal coordinates system that represents information using a (x, y) coordinate.

In operation 1121, the fingerprint verification apparatus may convert a coordinate system of the information on the frequency domain included in the input fingerprint image to a polar coordinate system based on a log-polar transform (LPT). In an example, the LPT may be performed with respect to a magnitude value of pixels in an FFT image obtained through the FFT. In the polar coordinate system, information may be represented through a radius, an angle, or a combination of the radius and the angle. In operation 1122, the fingerprint verification apparatus may apply the LPT to the information on the frequency domain included in the partial fingerprint image. Hereinafter, the LPT will be described with reference to FIG. 12.

Figure 12:
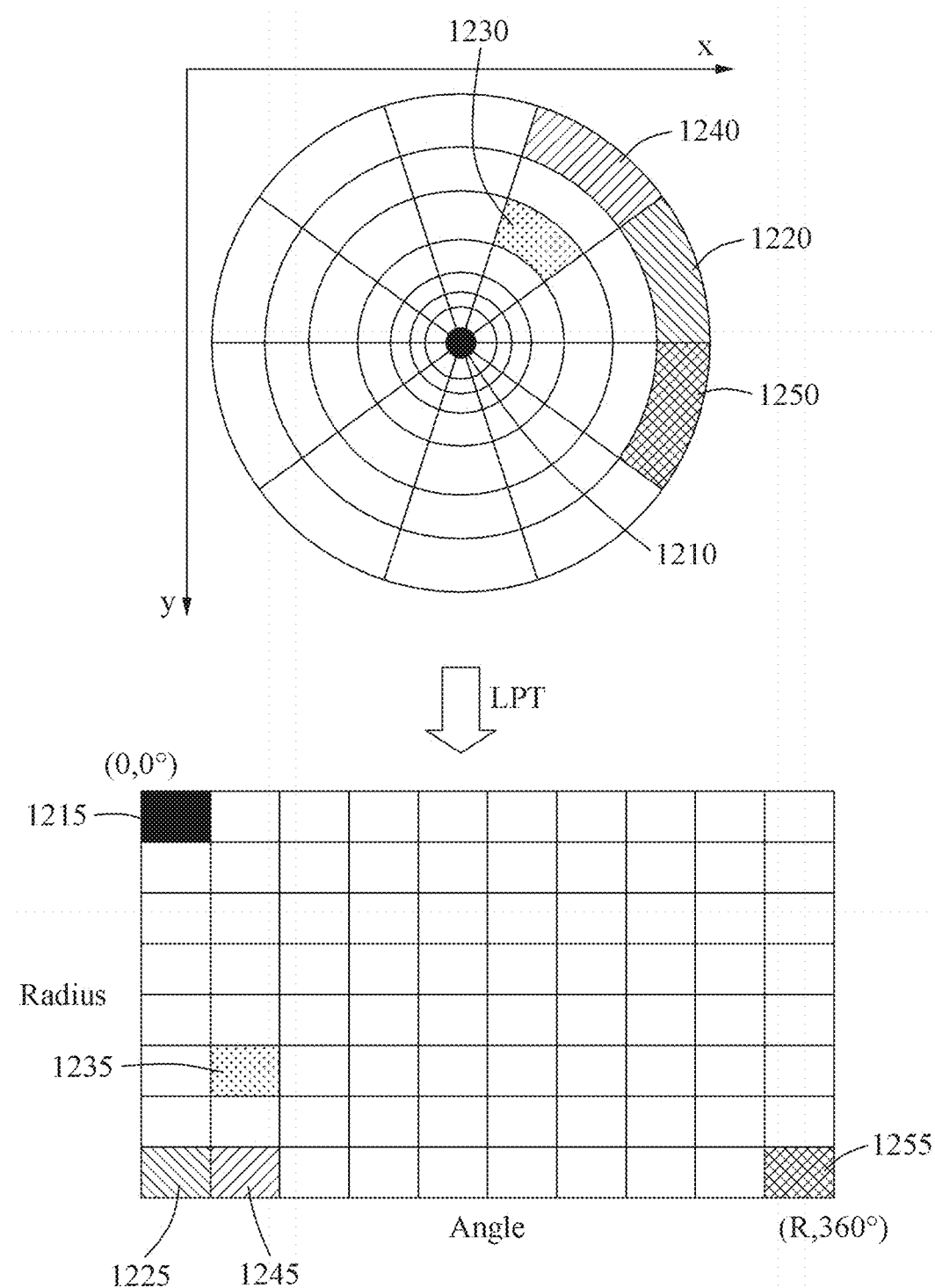
FIG. 12 illustrates an example of a log-polar transform (LFT) according to at least one example embodiment.

FIG. 12 illustrates an example of a log-polar transform (LIT) according to at least one example embodiment. Referring to FIG. 12, concentric circles may be set based on a center point 1210 in an orthogonal coordinate system. The concentric circles may be divided into a plurality of regions based on a radius, an angle, and a combination of the radius and the angle. In an example, the LPT may map the plurality of regions on the orthogonal coordinate system to regions on a polar coordinate system of (a radius, an angle). In this example, the center point 1210 may be mapped to a region 1215 corresponding to (0, 0°) of the polar coordinate system. Similarly, a first region 1220, a second region 1230, a third region 1240, a fourth region 1250 in the orthogonal coordinate system may be mapped to a first region 1225, a second region 1235, a third region 1245, and a fourth region 1255 in the polar coordinate system, respectively.

Although not illustrated, the LPF may map the plurality of regions on the orthogonal coordinate system to the regions on the polar coordinate system represented based on an angle. In this example, the first region 1220 in the orthogonal coordinate system may be mapped to a region (0°) in the polar coordinate system, the second region 1230 and the third region 1240 in the orthogonal coordinate system may be mapped to a region (36°) in the polar coordinate system, and the fourth region 1250 in the orthogonal coordinate system may be mapped to a region (324°) in the polar coordinate system.

Referring back to FIG. 11, in operation 1131, the fingerprint verification apparatus may apply the FFT to the input fingerprint image to which the LPT is applied. In operation 1132, the fingerprint verification apparatus may apply the FFT to the partial fingerprint image to which the LPT is applied. In operation 1140, the fingerprint verification apparatus may perform phase correlation and detect a peak as a result of performing the phase correlation. A position of the detected peak may indicate rotation information (θ) between the input fingerprint image and the partial fingerprint image.

In another example, the position of the peak may indicate scale information between the input fingerprint image and the partial fingerprint image. For example, one axis of an image to which the LPT is applied may correspond to an angle, another axis of the image may correspond to a radius, and the position of the peak detected by the phase correlation may be represented as (a coordinate of an axis corresponding to an angle, a coordinate of an axis corresponding to a radius). The coordinate of the axis corresponding to the angle may indicate rotation information, and the coordinate of the axis corresponding to the radius may indicate the scale information.

In general, since a fingerprint image does not change in scale, a radius may be fixed as a desired or, alternatively, predetermined value, for example, 1. In this example, the position of the peak detected by the phase correlation may be represented as a coordinate of an axis corresponding to an angle, and the coordinate of the axis corresponding to the angle may indicate the rotation information.

In an example, the fingerprint verification apparatus may detect a peak value by performing the phase correlation as described above, and determine a first similarity as described above based on the peak value. The peak value may increase according to a large number of identical regions or overlapping regions of fingerprint patterns between the input fingerprint image and the partial fingerprint image, or the peak value may increase when the fingerprint patterns between the input fingerprint and the partial fingerprint image are identical to each other. Thus, the fingerprint verification apparatus may determine the first similarity between the input fingerprint image and the partial fingerprint image based on the peak value detected through the phase correlation.

In operation 1150, the fingerprint verification apparatus may rotate the input fingerprint image based on the rotation information (θ). In operation 1160, the fingerprint verification apparatus may apply the FFT to the rotated input fingerprint image and perform the phase correlation in operation 1170. The peak may be detected as a result of performing the phase correlation, the position of the detected peak may indicate translation information (Tx, Ty) between the input fingerprint image and the partial fingerprint image. In operation 1180, the fingerprint verification apparatus may move the rotated input fingerprint image based on the translation information (Tx, Ty).

The fingerprint verification apparatus may rotate and move the input fingerprint image based on the rotation information and the translation information obtained by a Fourier-Mellin method to overlap the input fingerprint image and the partial fingerprint image. In an example, the fingerprint verification apparatus may determine a second similarity based on an overlapping region between the rotated and translated input fingerprint image and the partial fingerprint image. The fingerprint verification apparatus may determine the second similarity based on various methods. For example, the fingerprint verification apparatus may determine the second similarity by a normalized cross correlation scheme based on an image brightness value. For example, the fingerprint verification apparatus may determine the second similarity based on a correlation obtained by Equation 1 which defines, for example, a normalized cross correlation (ncc) function.

$$ncc(I_1, I_2) = \frac{\sum_{(i,j) \in W} I_1(i,j) \cdot I_2(x+i, y+j)}{\sqrt[2]{\sum_{(i,j) \in W} I_1^2(i,j) \cdot \sum_{(i,j) \in W} I_2^2(x+i, y+j)}} \quad \text{[Equation 1]}$$

In Equation 1, the term W denotes an overlapping region between an image $I_1$ and an image $I_2$, and the expression $ncc(I_1, I_2)$ denotes a correlation in the overlapping region W between the image $I_1$ and the image $I_2$. The image $I_1$ denotes a rotated input fingerprint image and the image $I_2$ denotes a partial fingerprint image. The term i denotes an X-axis coordinate of a pixel in the overlapping region and j denotes a Y-axis coordinate of a pixel in the overlapping region. The term x denotes translation information (T)x in a direction of the X-axis, and y denotes translation information (Ty) in a direction of a Y-axis. The expression $I_1(i,j)$ denotes a pixel value (e.g., a pixel brightness value) in a coordinate (i,j) of the image $I_1$, and the expression $I_2(x+i, y+j)$ denotes a pixel value (e.g., a pixel brightness value) in a coordinate (x+i, y+j) of the image $I_2$.

Figure 13:
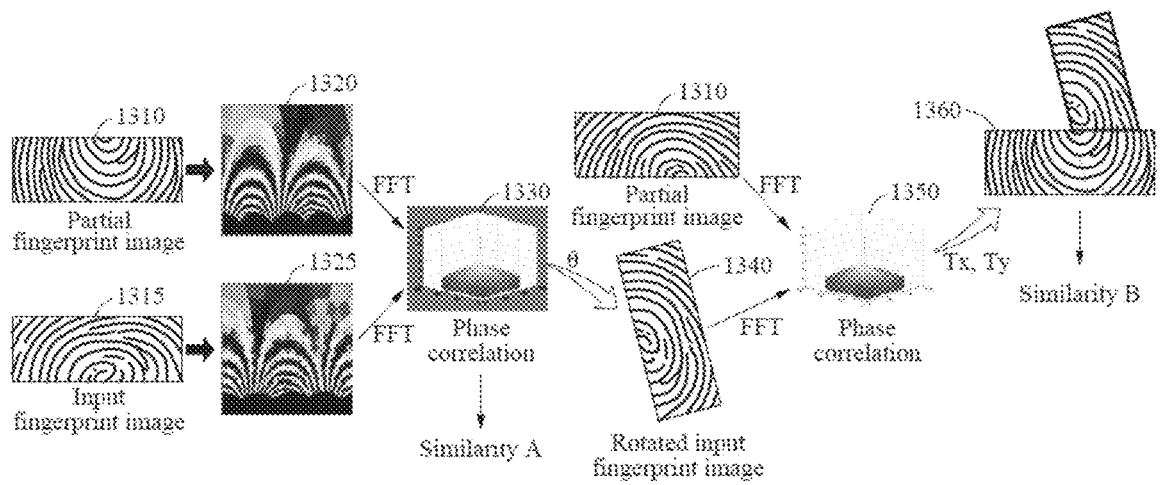
FIG. 13 illustrates an example of processing an input fingerprint image and partial fingerprint images for calculating a similarity according to at least one example embodiment.

FIG. 13 illustrates an example of processing an input fingerprint image and partial fingerprint images for calculating a similarity according to at least one example embodiment. According to at least some example embodiments, the operations illustrated in, and/or discussed below with respect to, FIG. 13 may be performed by a fingerprint verification operation (e.g., the fingerprint verification apparatus 410).

Referring to FIG. 13, an enrolled partial fingerprint image 1310 may be converted to a first LPT image 1320 based on an FFT and a LPT. An input fingerprint image 1315 may be converted to a second LIT image 1325 based on the FFT and the LPT.

The rotation information (θ) between the input fingerprint image 1315 and the partial fingerprint image 1310 may be determined based on phase correlation 1330 between the first LIT image 1320 and the second LPT image 1325, and a similarity A between the input fingerprint image 1315 and the partial fingerprint image 1310 may be determined based on a peak value detected by the phase correlation 1330. According to at least some example embodiments, similarity A of FIG. 13 corresponds to the first similarity of FIG. 6 and the second similarity of FIG. 7.

The input fingerprint image 1315 may be rotated based on the rotation information (θ). The translation information (Tx, Ty) between the input fingerprint image 1315 and the partial fingerprint image 1310 may be determined by the phase correlation 1350 between an FFT image of a rotated input fingerprint image 1340 and an FFT image of the partial fingerprint image 1310. Based on the rotation information (θ) and the translation information (Tx, Ty), the partial fingerprint image 1310 (e.g., the rotated input fingerprint image 1340) may be matched to the input fingerprint image 1315 to create a matched image 1360. A correlation may be determined in an overlapping region between the partial fingerprint image 1310 and the rotated input fingerprint image 1340, and a similarity B between the rotated input fingerprint image 1340 and the partial fingerprint image 1310 may be determined based on the correlation in the matched image 1360. According to at least some example embodiments, similarity B of FIG. 13 corresponds to the third similarity of FIG. 7 and the fourth similarity of FIG. 8.

Figure 14:
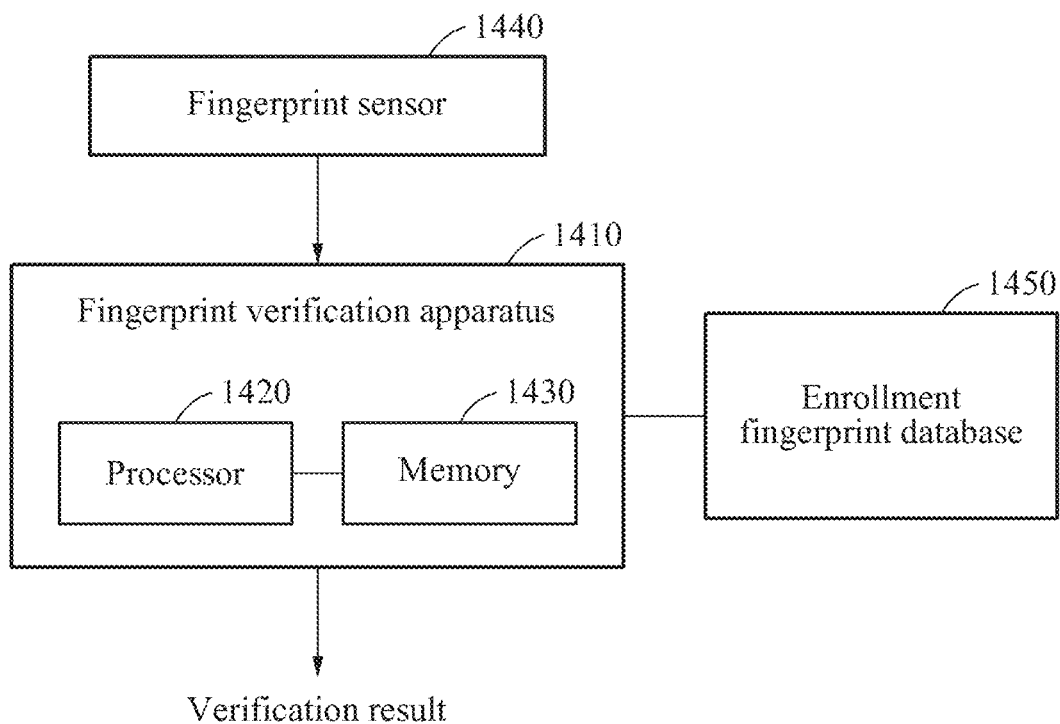
FIG. 14 illustrates an example of a fingerprint verification apparatus according to at least one example embodiment.

FIG. 14 illustrates an example of a fingerprint verification apparatus according to at least one example embodiment.

Referring to FIG. 14, a fingerprint sensor 1440 obtains an input fingerprint image by capturing a fingerprint of a user. The input fingerprint image may be transferred to a fingerprint verification apparatus 1410, and the fingerprint verification apparatus 1410 may perform fingerprint verification by comparing the input fingerprint image to each of partial fingerprint images enrolled in an enrollment fingerprint database 1450. The user may enroll the partial fingerprint images for each at least one finger based on the enrollment process, and the enrollment fingerprint database 1450 may store the enrolled partial fingerprint images. Although FIG. 14 is described with reference to an example where the fingerprint sensor 1440 is separate from the fingerprint verification apparatus 1410, according to at least some example embodiments, the fingerprint sensor 1440 is included in the fingerprint verification apparatus 1410. Further, according to at least some example embodiments, the fingerprint sensor 1440 is an example implementation of the fingerprint sensor 420 of FIG. 4.

The fingerprint verification apparatus 1410 performs the aforementioned fingerprint verification method or at least one illustrated fingerprint verification method and outputs a result of verifying. Although the fingerprint verification apparatus 1410 may output the result of the verifying as a voice, a vibration, a text, an image, and a video, this is to be understood as a non-limiting example. The fingerprint verification apparatus 1410 may output the result of the verifying in various forms. The fingerprint verification apparatus 1410 may be connected to an external device, for example, a personal computer (PC) or a network, through an input and output device (not shown) and exchange data.

The fingerprint verification apparatus 1410 includes at least one processor 1420 and a memory 1430. The memory 1430 communicates with the processor 1420 and stores data to be calculated by the processor 1420 or instructions to be performed by the processor 1420. The processor 1420 executes the instructions and retrieves or fetches the instructions from an internal register, an internal cache, the memory 1430, or a storage to execute the instructions. The processor 1420 records at least one result of the executing in the internal register, the internal cache, the memory 1430, or the storage. In an example, the processor 1420 may execute the instructions to perform at least one operation illustrated in FIG. 14. For example, the processor 1420 may select at least one fingerprint group among a plurality of fingerprint groups based on an input fingerprint image and determine whether verification is successful by comparing the input fingerprint image to each of partial fingerprint images included in the selected fingerprint group. The processor 1420 may be, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers. According to at least some example embodiments, the fingerprint verification apparatus 410 of FIG. 4 may have the same structure as that illustrated in FIG. 14 with respect to the fingerprint verification apparatus 1410. For example, any functions described herein as being performed by the fingerprint verification apparatus 410, the fingerprint verification apparatus 1410, or a fingerprint verification apparatus may be performed using the structure of the fingerprint verification apparatus 1410 illustrated in FIG. 14. For example, the memory 1430 may store program code including instructions for causing the processor 1420, when executing the program code, to perform any or all functions described in the present disclosure as being performed by any fingerprint verification apparatus (including, for example, the fingerprint verification apparatus 410, and/or the fingerprint verification apparatus 1410).

Although examples described herein relate to performing fingerprint verification, using an input fingerprint image in which a fingerprint of a user is present, such examples may be further applied to performing biometric verification using biometric data of the user. In this example, the biometric data may be obtained by various sensors and include information on the fingerprint of the user, information on body impedance, information on blood vessels, and information on an iris. The processor 1420 determine first similarities between input biometric data and enrolled biometric data and selects first candidate biometric data from the enrolled biometric data based on the first similarities. The processor 1420 determines second similarities between the input biometric data and the first candidate biometric data and selects at least one biometric data group based on the second similarities. The processor 1420 determines whether the verification is successful by comparing the input biometric data to the enrolled biometric data included in the selected biometric data group.

In an example, an iris pattern between a pupil and sclera which is a white area of an eye may be scanned or captured through a sensor (not shown), and a partial image corresponding to a portion of the iris pattern may be obtained. The processor 1420 may verify a user by comparing the obtained partial image to each of partial images of the enrolled iris pattern.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A fingerprint verification method comprising:
obtaining an input fingerprint image using a fingerprint sensor;
selecting, by a processor, one or more first fingerprint groups from a plurality of finger print groups based on the input fingerprint image, the plurality of fingerprint groups include partial fingerprint images corresponding to a plurality of fingers, respectively;
determining, by the processor, whether verification is successful based on a similarity between the input fingerprint image and each of the partial fingerprint images included in the one or more first fingerprint groups; and controlling, by the processor, a lock state or an access right of a terminal device based on the result of the verification, wherein the selecting one or more first fingerprint groups comprises:

determining first similarities between the input fingerprint image and each of the partial fingerprint images included in the plurality of fingerprint groups; and selecting the one or more first fingerprint groups based on the first similarities.

2. The method of claim 1, wherein the determining first similarities comprises:

determining the first similarities based on image frequency information of the input fingerprint image and image frequency information of each of the partial fingerprint images included in the plurality of fingerprint groups.

3. The method of claim 2, wherein the determining first similarities comprises:

performing phase correlation between the input fingerprint image and the partial fingerprint images included in the plurality of fingerprint groups by a Fourier-Mellin method and determining the first similarities based on a peak value detected based on a result of the performing the phase correlation.

4. The method of claim 1, wherein the selecting one or more first fingerprint groups further comprises:

selecting first candidate partial fingerprint images for each fingerprint group based on the first similarities;

determining second similarities between the input fingerprint image and each of the first candidate partial fingerprint images; and selecting the one or more first fingerprint groups based on the second similarities.

5. The method of claim 4, wherein the selecting first candidate partial fingerprint images comprises:

selecting a first number of the first candidate partial fingerprint images for each fingerprint group based on the first similarities.

6. The method of claim 4, wherein the determining second similarities comprises:

rotating and translating the input fingerprint image based on rotation information and translation information obtained by a Fourier-Mellin method, and determining the second similarities based on overlapping regions between the rotated and translated input fingerprint image and the first candidate partial fingerprint images.

7. The method of claim 6, wherein the determining second similarities comprises:

determining the second similarities by a normalized cross correlation scheme based on an image brightness value in the overlapping regions.

8. The method of claim 4, wherein the second similarities are determined by a scheme having a computational complexity higher than that of a scheme used for determining the first similarities.

9. The method of claim 4, wherein the determining whether verification is successful comprises:

determining whether the verification is successful based on the determined second similarities between the input fingerprint image and each of the partial fingerprint images included in the one or more first fingerprint groups.

10. The method of claim 4, wherein the determining whether verification is successful comprises:

determining whether the verification is successful based on the determined second similarities between the input fingerprint image and each of the first candidate partial fingerprint images included in the one or more first fingerprint groups.

11. The method of claim 4, wherein the selecting one or more first fingerprint groups comprises:

determining a plurality of representative values for the plurality of fingerprint groups, respectively, based on the second similarities, and selecting the one or more first fingerprint groups based on the determined plurality of representative values.

12. The method of claim 4, wherein the determining whether verification is successful comprises:

selecting at least one partial fingerprint image to be used for score calculation among the partial fingerprint images included in the one or more first fingerprint groups based on the second similarities;

calculating a score for the verification based on the at least one selected partial fingerprint image; and determining whether the verification is successful based on the score.

13. The method of claim 1, wherein the determining whether verification is successful comprises:

selecting at least one candidate partial fingerprint image from the partial fingerprint images included in the one or more first fingerprint groups; and determining whether the verification is successful based on a similarity between the input fingerprint image and the at least one candidate partial fingerprint image.

14. The method of claim 1, wherein each fingerprint group of the plurality of fingerprint groups includes pre-enrolled partial fingerprint images for each finger of a plurality of fingers.

15. A biometric verification method comprising:

obtaining input biometric data using a sensor;

selecting, by a processor, first candidate biometric data from enrolled biometric data based on first similarities between the input biometric data and the enrolled biometric data, the enrolled biometric data being arranged in a plurality of biometric data groups;

selecting, by the processor, one or more biometric data groups from the plurality of biometric data groups based on second similarities between the input biometric data and the first candidate biometric data;

determining, by the processor, whether verification is successful based on a similarity between the input biometric data and the enrolled biometric data included in the one or more biometric data groups; and controlling, by the processor, a lock state or an access right of a terminal device based on the result of the verification, wherein the input biometric data includes an input fingerprint, wherein the plurality of biometric data groups include partial fingerprint images corresponding to a plurality of fingers, respectively, and wherein the first similarities include similarities between the input fingerprint and each of the partial fingerprint images included in the plurality of biometric data groups.

16. A non-transitory computer-readable medium storing a computer program including instructions that, when executed by one or more processors, cause the one or more processors to implement the method of claim 1.

17. A fingerprint verification apparatus comprising:

a fingerprint sensor configured to obtain an input fingerprint image;

a memory storing computer-readable instructions; and one or more processors configured to execute the computer-readable instructions such that the one or more processors are configured to,
  perform an operation of selecting one or more first fingerprint groups from a plurality of fingerprint groups based on the input fingerprint image, the plurality of fingerprint groups include partial fingerprint images corresponding to a plurality of fingers respectively,
  perform an operation of determining whether verification is successful based on a similarity between the input fingerprint image and each of the partial fingerprint images included in the one or more first fingerprint groups, and
  perform an operation of controlling a lock state or an access right of a terminal device based on the result of the verification,
  wherein the selecting one or more first fingerprint groups from the plurality of fingerprint groups comprises:
    determining first similarities between the input fingerprint image and each of the partial fingerprint images included in the plurality of fingerprint groups; and
    selecting the one or more first fingerprint groups based on the first similarities.

18. The apparatus of claim 17, wherein the one or more processors are configured to execute the computer-readable instructions such that the one or more processors are configured to,
  Perform the operation of determining the first similarities based on image frequency information of the input fingerprint image and image frequency information of each of the partial fingerprint images included in the plurality of fingerprint groups; and
  perform an operation of selecting first candidate partial fingerprint images for each fingerprint group of the plurality of fingerprint groups based on the first similarities,
  wherein the selecting the one or more first fingerprint groups based on the first similarities includes selecting the one or more first fingerprint groups based on second similarities between the input fingerprint image and each of the first candidate partial fingerprint images.

19. The apparatus of claim 18, wherein the one or more processors are configured to execute the computer-readable instructions such that the one or more processors are configured to,
  perform an operation of selecting at least one second candidate partial fingerprint image from the partial fingerprint images included in the one or more first fingerprint groups; and
  perform an operation of determining whether the verification is successful based on a third similarity between the input fingerprint image and the at least one second candidate partial fingerprint image.

* * * * *